(12) United States Patent
Hua

(10) Patent No.: US 10,976,341 B2
(45) Date of Patent: *Apr. 13, 2021

(54) MULTI SENSOR POSITION AND ORIENTATION MEASUREMENT SYSTEM

(71) Applicant: Wensheng Hua, Fremont, CA (US)

(72) Inventor: Wensheng Hua, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,894

(22) Filed: Dec. 12, 2019

(65) Prior Publication Data

US 2020/0116753 A1    Apr. 16, 2020

Related U.S. Application Data

(63) Continuation of application No. 16/179,678, filed on Nov. 2, 2018, now Pat. No. 10,613,114, which is a continuation of application No. 14/676,643, filed on Apr. 1, 2015, now Pat. No. 10,168,352, which is a continuation of application No. 13/248,022, filed on Sep. 28, 2011, now Pat. No. 9,024,772.

(60) Provisional application No. 61/387,065, filed on Sep. 28, 2010.

(51) Int. Cl.
*G01P 15/14* (2013.01)
*G01C 21/16* (2006.01)
*G01C 19/00* (2013.01)

(52) U.S. Cl.
CPC .............. *G01P 15/14* (2013.01); *G01C 19/00* (2013.01); *G01C 21/165* (2013.01)

(58) Field of Classification Search
CPC ....................................................... G01P 15/14
See application file for complete search history.

(56) References Cited

U.S. PATENT DOCUMENTS

| | | |
|---|---|---|
| 6,636,826 B1 | 10/2003 | Abe et al. |
| 7,970,500 B2 | 6/2011 | De La Parra Carque |
| 2005/0022402 A1* | 2/2005 | Ash ..................... E21B 47/022 33/321 |
| 2005/0038560 A1 | 2/2005 | Nagasaka |
| 2007/0032748 A1 | 2/2007 | McNeil et al. |
| 2009/0309759 A1 | 12/2009 | William |
| 2010/0018285 A1 | 1/2010 | Murphy et al. |
| 2011/0191040 A1 | 8/2011 | Bechhoefer et al. |
| 2011/0276262 A1 | 11/2011 | Ruizenaar |
| 2012/0050095 A1 | 3/2012 | Scherzinger et al. |
| 2013/0081442 A1 | 4/2013 | Basir et al. |

OTHER PUBLICATIONS

"International Geomagnetic Reference Field, http://www.ngdc.noaa.gov/IAGA/vmod/igrf.html", WDC for Solid Earth and Geophysics, Jan. 28, 2010, 2 pages.
"Wahba's problem, http//en.wikipedia.org/wiki/Wahba's_problem", downloaded Oct. 28, 2014, p. 1.
"WGS 84 Earth Gravitational Model, http://earth-info.nga.mil/GandG/wgs84/gravitymod", National Geospatial Intelligence Agency, Office of Geomatics. Geosciences Division, Apr. 29, 2013, 2 pages.

* cited by examiner

*Primary Examiner* — Manuel A Rivera Vargas
(74) *Attorney, Agent, or Firm* — Edward C. Kwok; VLP Law Group, LLP

(57) ABSTRACT

A system combines contributions from various sensors to obtain an object's position, velocity, or orientation.

24 Claims, 1 Drawing Sheet

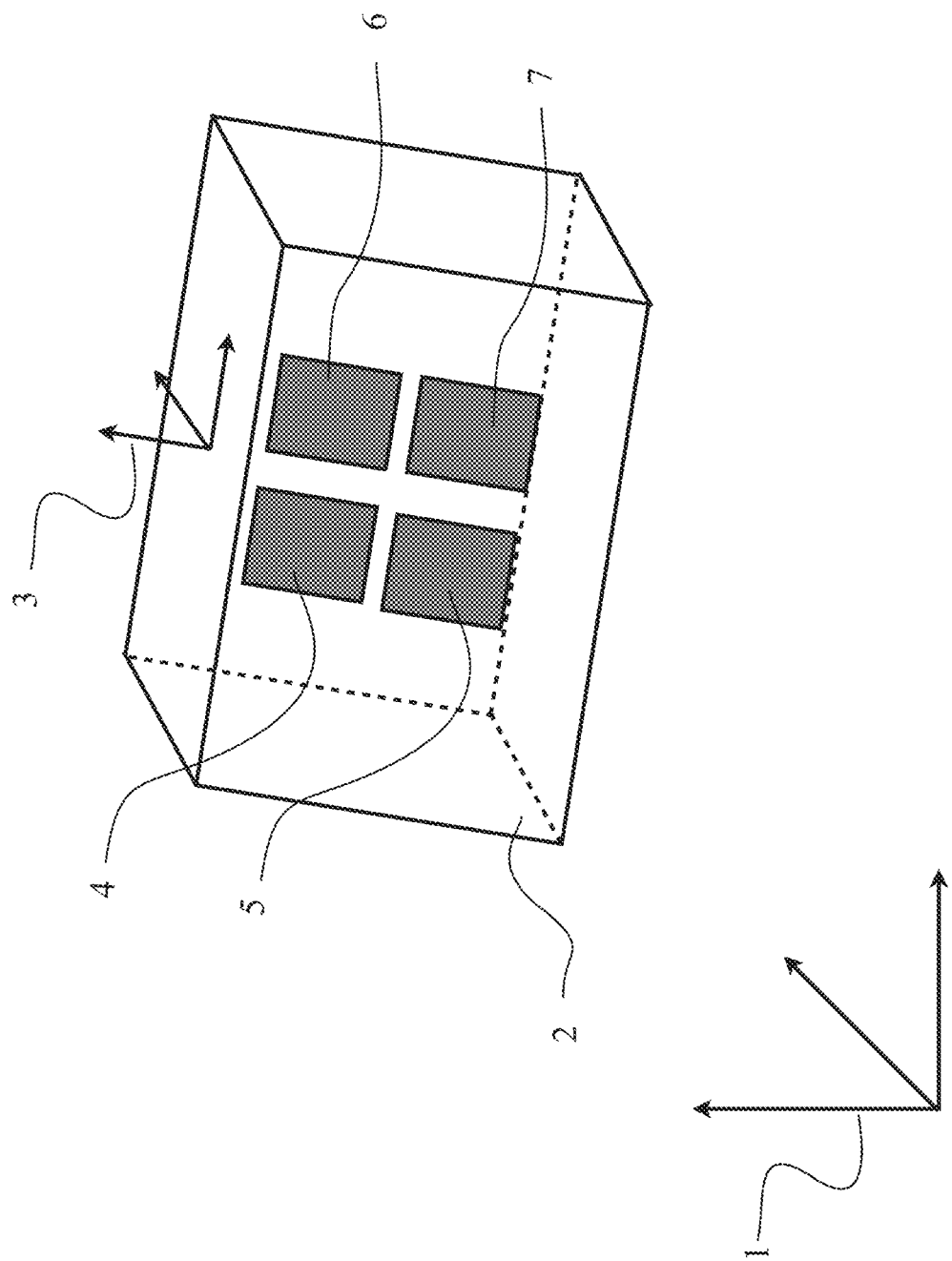

MULTI SENSOR POSITION AND ORIENTATION MEASUREMENT SYSTEM

CROSS REFERENCE TO RELATED APPLICATIONS

The present application relates to and claims priority of U.S. non-provisional patent application ("Non-Provisional Application I"), entitled: "Multi Sensor Position and Orientation System," Ser. No. 16/179,678, filed on Nov. 2, 2018, which is a continuation application of U.S. non-provisional patent application ("Non-Provisional Application II"), entitled: "Multi Sensor Position and Orientation System," Ser. No. 14/676,643, filed on Apr. 1, 2015, which is a continuation application of U.S. non-provisional patent application ("Non-Provisional Application III"), entitled: "Multi Sensor Position and Orientation System", Ser. No. 13/248,022, filed on Sep. 28, 2011, which claims priority of U.S. provisional patent application ("Provisional Application"), entitled: "A Multi Sensor Position and Orientation System", Ser. No. 61/387,065, filed on Sep. 28, 2010. The Provisional Application and the Non-Provisional Applications I, II and III are each hereby incorporated by reference in its entirety.

BRIEF DESCRIPTION OF DRAWINGS

FIG. 1 shows placement of multiple sensors on an object.

DESCRIPTION

A device is invented to combine different signals from various sensors together so that an object (such as a car, an airplane etc.)'s position and/or orientation can be measured. The sensors may include translational inertial sensors (such as accelerometers), inertial rotation sensors (such as gyroscopes), absolute angle sensors (such as magnetometers) and absolute position sensors (such as the GPS sensors).

FIG. 1 shows an exemplary placement of multiple sensors on the object in one of the embodiments. 1 is the earth's reference frame. 2 is the object whose position and orientation are to be measured. 3 is the object's body frame. 4 is the GPS sensor which measures the object's position in earth's reference frame. 5 is a 3-dimensional accelerometer which measures the object's apparent acceleration in the object's body frame. 6 is a 3-dimensional gyroscope which measures the object's rotation in the object's body frame. 7 is a 3-dimensional magnetometer which measures the magnetic field in the object's body frame. The sensitive directions of the accelerometer, the gyroscope and the magnetometer should be aligned with the directions of the body reference frame.

In some embodiments of the invention, the signals from the sensors are sent to an A-to-D converter if they are not in digital format already. The digital signals then are send to a computational device such as a computer or the like (such as a DSP chip) to do the calculation.

In some embodiments of the invention, the sampling frequency should be determined following digital signal processing common practice. The sampling frequency should be high enough to avoid aliasing. If there is too much high frequency noise from the sensors, low-pass filters should be applied before A-to-D conversion.

Note that in preferred embodiments, digital signal and computers (or the likes) are used for the signal processing methods of this invention. However, in some embodiments, analog implementations are possible too, achieved by following the same principles and algorithms as described herein.

In one embodiment of the invention, the absolute position sensor is used to measure the object's position with respect to earth. Since earth's motion is well known, the difference between the physical inertial space and the earth can be easily compensated). The absolute position sensor, such as a GPS sensor, may have a large noise and a low data-update rate, and may not be available all the time. In one embodiment of the invention, signals from absolute position sensors are combined with signals from inertial sensors such as accelerometers which provide information of the target's position at high frequencies with respect to the object's current position and origination. Since the inertial position sensors and the absolute position sensors do not measure in the same reference frame, in one embodiment orientation sensors (i.e., angle sensors) are used to align the two reference frames together. Both inertial and absolute angle sensors can be used. In one embodiment the magnetometers are used to measure the earth's magnetic field thus measure the object's orientation with respect to earth's magnetic field. Other sensors can be used as absolute angle sensor as well.

In some embodiments, the absolute angle sensor does not provide 3 degree of freedom angle measurement needed for aligning absolute position sensor and inertial position sensor. Additional inertial angle sensors such as gyroscopes are used. The object's orientation information can be derived from the accelerometers. If the object's acceleration is small with respect to earth, its accelerometer's output will be approximately earth's gravity g pointing to the center of the earth. The orientation of the object can be estimated by measuring the earth's magnetic field vector (by magnetometers) and gravitational field vector (by accelerometers) in the object's body frame. From these two vectors, the relative angles between the earth's reference frame and the object's origination frame can be derived by solving Wabha's problem. One solution of Wabha's problem can be found http://en.wikipedia.org/wiki/Wahba's_problem.

The accelerometer measures the apparent acceleration of the object in the object's body frame. Its output is the sum of the object's acceleration, denoted as a, with respect to earth and earth's gravitation, denoted as g.

$$A = a + g$$

Here A, a and g are all 3 by 1 vectors.

One can use the accelerometer's output as an estimate of the gravitation field, treating the object's own acceleration as an error. However, when the object's acceleration is large, a large orientation error will be introduced. In a preferred embodiment, multiple measurements of the object's acceleration are combined to reduce the error. The acceleration measurements are combined using information regarding the object's rotation, which can be obtained from the rotation sensors. In one embodiment, the rotation information is obtained from one or more gyroscopes. Rotation information from other rotation sensors can be used too.

In a preferred embodiment, the acceleration measurements at different times are aligned using the relative rotation between them (i.e., taking into account that, as the object rotates, the acceleration measurements are taken at different orientations of the body's reference frame).

$$A_n^r(k) = R_n^k A(k)$$

Here $A(k)$ denotes the acceleration measurement at time sample k. $R_n^k$ denotes the rotation matrix that transforms the object's body reference frame at time sample k to the body reference frame at time sample n. $R_n^k$ is a 3 by 3 matrix that maps a vector in the object's body frame at time k to the object's body frame at time n. $R_n^k$ denotes the acceleration measurement measured at time k but represented in the object's body frame at time n. $A_n'(k)$ is also called the aligned measurement.

One way of combining the aligned measurements the moving average of the aligned accelerations.

$$A_n^c(n) = \sum_{m=0}^{N} w(m) A_n^r(n-m)$$

Here w(m) are weights. This is equivalent to filter the aligned signals with a Finite Impulse Response (FIR) filter with filter coefficients w(m). Another way of combing the aligned acceleration measurements is to use an Infinite impulse response filter (IIR) filter.

$$A_n^c(n) = \sum_{m=0}^{N_2} w(m) A_n^r(n-m) - \sum_{m=0}^{N_1} u(m) A_n^c(n-m)$$

where w(m) and u(m) are filter coefficients. The advantage of IIR filters is that they tend to have fewer coefficients and fewer filter states and thus require fewer calculations per second to implement.

Note that the filters here are a little different from the normal digital filters. The filters states are $A_n^r(n-m)$ and/or $A_n^c(n-m)$. We need to rotate the state vector's reference frame with each update:

$$A_{n+1}^r((n+1)-(m+1)) = R_{n+1}^n A_{n+1}^r(n-m)$$

Where $R_{n+1}^n$ is the rotation matrix from the object's body frame at time sample n to time sample (n+1). In one embodiment, $R_{n+1}^n$ is measured by a gyroscope directly. The gyroscope measures the rotation speed with respect to the body frame. Denote the output of the gyroscope at time n as $$[r_x(n), r_y(n), r_z(n)]^T$$

Then, the corresponding rotation matrix $R_{n+1}^n$ can be constructed as $$R_{n+1}^n = \begin{pmatrix} 1 & -r_z(n) & r_y(n) \\ r_z(n) & 1 & -r_x(n) \\ r_y(n) & r_x(n) & 1 \end{pmatrix} T_S$$

where $T_S$ is the sampling time.

The reference frame of state vector $A_n^r(n-m)$ (with index m at time sample n) is rotated to the object's body frame at time sample (n+1) and becomes the state vector with index (m+1). Similarly, we can update $A_n^c(n-m)$ $$A_{n+1}^c((n+1)-(m+1)) = R_{n+1}^n A_n^c(n-m)$$

Note the method of updating filter states applies to both IIR and FIR filters. For notation purpose, denote the filtering operation as $$A_{n+1} = F(A_n^r)$$

where $A_n^r$ is the input of the filter and $A_n^c$ is the output of the filter.

The filters are designed to minimize the orientation error. For example, when linear filters are used, the output of the filter can be represented by $$A_n^c(n) = a_n^c + g_n^c(n)$$

Where $a_n^c$ is the object's filtered (i.e., combined) acceleration with respect to the object's body frame at time sample n; $g_n^c$ is the earth's gravity filtered (i.e., combined) by the filter represented in the object's body frame at time sample n. In a preferred embodiment, the filter is designed in a way that contributions of gravity at different times are combined coherently and contributions of the object's acceleration with respect to earth is combined incoherently. Thus, the ratio of the magnitude of $a_n^c(n)$ and $g_n^c(n)$ is smaller than the ratio of the magnitudes of object acceleration and gravity for the majority of the time:

$$\frac{|a_n^c(n)|}{|g_n^c(n)|} < \frac{|a(n)|}{|g(n)|};$$

for a majority of n

If $A_n^c(n)$ is used along the direction of gravity, the angle error due to this assumption is bounded by the ratio of the magnitudes of $a_n^c(n)$ and $g_n^c(n)$.

$$\text{angle error} < \frac{|a_n^c(n)|}{|g_n^c(n)|}$$

Hence, reducing the ratio of the magnitudes of $a_n^c(n)$ and $g_n^c(n)$ helps to reduce the orientation error.

There are many ways that filters can be designed so that the ratio of the magnitudes of $a_n^c(n)$ and $g_n^c(n)$ can be reduced.

For example, one way is in a situation where the object's average velocity does not change much over time. One of such situation is when an airplane is in cruise mode. The airplane might experience a lot of short term high acceleration events due to air turbulence, but is long term average velocity remains roughly constant. In such situation, one can design a filter that simply sums the aligned accelerations within a certain fixed duration (i.e., integration time) of time using an FIR filter.

$$A_n^c(n) = \sum_{m=0}^{N} A_n^r(n-m)$$

i.e., the weights w(m)=1.

The integration time defined as $$T_S = Nt$$

where $T_S$ denotes the sampling frequency. For example, one can pick the duration as 1000 seconds. During that 1000 seconds, the combined (filtered) gravity $g_n^c(n)$ will be approximately 10,000 m/s which is much faster than most airplanes can fly. If it is known that the airplane's velocity does not change more than 100 m/s during 1000 seconds, which means that $a_n^c(n)$ is less than 100 m/s. Hence, the orientation error by assuming $A_n^c(n)$ is pointing to gravity's direction is less than 0.01 rad. During this period, the airplane might have short-term accelerations as large as 10 m/s², in that case, the orientation error can be as large as π.

However, the integration time should not be made too long. The angle measurement has an error too. For example, when a gyroscope is used to measure the rotation matrix, its error will contribute to the combined signal through the alignment process (or the reference frame rotation process) discussed above. The integration time needs to be chosen so that the overall noise can be minimized. A good strategy is to choose an integration time such that the two error sources' contribution are roughly the same. For example, assume that the object's velocity change is limited by $|a_n^c(n)|<V$. Hence, the orientation error with N samples is then approximately $$\varepsilon \approx \frac{V}{Ng}$$

If one more sample is used, the change of the error due to a larger $|g_n^c(n)|$ is $$\delta_g \varepsilon \approx -\frac{1}{N}\varepsilon$$

The change of error due to a rotation measured by an imperfect gyroscope becomes:

$$\delta_r \varepsilon \approx -\frac{\delta(R_n^{n-N-1})g}{V}\varepsilon$$

where is $\delta(R_n^{n-N-1})$ the error of the rotation matrix. Since $\delta(R_n^{n-N-1}) \approx d_r N T_S g$, where $d_r$ is the gyroscope's drift rate measured in unit of rad per second. Hence to minimize $\varepsilon$, we need $\delta\varepsilon=\delta_r\varepsilon+\delta_g\varepsilon=0$, i.e., $\delta_r\varepsilon=-\delta_g\varepsilon$, which means $$N = \sqrt{\frac{V}{gd_r T_S}}$$

The integration time can also be determined by simulation. One can write a computer program to simulate the whole system with the object's motion, the sensor's random noise and the filtering algorithm. Different integration times can be used for different simulation runs. Different motion paths might be used for multiple simulation runs. Simulation can also be repeated multiple times, so that random errors of the sensors result in different impacts. The integration time that provides the lowest average error is selected.

The integration time can also be determined by experiment. If another means of measuring the object's orientation is available (e.g., a differential radar system) for measuring the object's true orientation, then the best integration time can be selected by the one that gives the minimum error.

An IIR filter can be used to calculate $A_n^c$ too. For example, a single state IIR filter can be used:

$$A_n^c(n)-(1-u)A_n(n)+uA_n^c(n-1)$$

where $0<u<1$ determines the characteristic time of the single pole IIR filter. A lesser u is equivalent to having a longer integration time and vice versa. The value u should be chosen by minimizing the overall error, including the error contributed by the object's acceleration and the error contributed by rotation measurement errors, similar to the FIR case. The value u can also be determined by simulation, similar to the FIR case. The optimal u can be determined by the one that offers the minimum average error in simulation. The value u can be determined by experiment using other sensors that can measure the true orientation too. The advantage of an IIR filter is that it requires both fewer number of states and fewer number of calculations per second.

Another approach may be taken when it is known that the object's position and velocity are both limited to certain values. For example, when the object is a controller in a computer game, the user may swing the controller with a lot of acceleration, but the velocity and the location of the controller are limited. In this case, filters can be used to calculate the integrated distance from the aligned acceleration measurements. One can use an FIR filter such as:

$$A_n^c(n) = \sum_{m=0}^{N} m A_n^r(n-m)$$

Or one can use an IIR filter, such as:

$$A_n^c(n)=\alpha^2 A_n(c)+2(1-\alpha)A_n^c(n-1)-(1-\alpha)^2 A_n^c(n-2)$$

which is a second order IIR filter with $w(0)=\alpha^2$, $u(1)=-(1-\alpha)$, $u(2)=(1-\alpha)^2$, $N_1=1$, and $N_2=2$. The value a determines the characteristic time of the filter. A smaller a means a longer equivalent integration time. The value a can be determined by simulation and/or testing.

The value of $g_n^c(n)$ grows rapidly with integration time. For example, when the integration time is 100 seconds, $g_n^c(n)$ is approximately 50000 meters. When the object's motion is limited to a 100-meter range, the orientation error is around $\frac{1}{500}$ rad, as most of the body's acceleration is canceled out in the combination process.

In general, the combination (i.e., integration) filters can be designed using standard digital filter design techniques. In many situations, the object's aligned acceleration mostly has high-frequency components, while the error due to rotation measurement error has mostly low-frequency components and the gravity field only has DC components. Typically, a low-pass filter should be designed with its cut-off frequency—which is roughly equivalent to the inverse of the integration time in above examples—selected to reduce the error caused by the object's acceleration (i.e. allow them to cancel out in the combined signal), but without magnifying the error due to rotation measurement errors too much. At the same time, the filter should have a large enough DC gain, so that the gravity terms can be added together coherently. The general design procedure by simulation includes these steps to:

1. measure the noise level of the sensors (e.g., by setting the sensors still and measure the output with a spectrum analyzer);

2. determine a set of simulation paths of the object, including both location and orientation, as a function of time (e.g., the path can be established by (i) measuring the object's real motion using other sensors, such as measuring an airplane's motion by radar systems, or (ii) constructing the motion by a set of rules, such as setting the user's walk at a speed of 2 meter/s in a random direction and his swing of the game controller at 10 rad/s at random times, changing direction whenever he hits a wall, which is defined by the 4 meter by 4 meter game room);

3. simulate the physical object with all the sensors multiple times, using the laws of physics, the sensor noise levels and the object paths obtained in steps 1 and 2 and recording all sensor outputs and the object's real positions and orientations, so that the sensors' random noise are different values in each simulation run;

4. calculate the signal spectrum densities of $a_n^c$ and the error introduced to $A_n^c$ by rotation measurement errors;

5. design a filter that efficiently filters out both error sources in the spectrum and has a large enough DC gain, using common filter design techniques;

6. apply the designed filter in simulations to test its error level; and 7. adjust the filter design (e.g., its cut-off frequency and its DC gain), repeating steps 5 and 6 until an optimal/desired filter is obtained.

When absolute position sensors (e.g, GPS) are available, orientation measurement error can be further reduced. The absolute position sensors measure the objects motion with respect to earth. One way to use the absolute position information is to construct a matching vector of $A_n^c(n)$ in earth's reference frame, $A_e^c(n)$:

$$A_e^c(n) = a_e^c(n) + g_e^c(n)$$

$a_e^c(n)$ and $g_e^c(n)$ may be constructed using the same filter as used in constructing $A_n^c(n)$:

$$a_e^c = F(a_e) \text{ and } g_e^c = F(g_e)$$

where $g_e(n)=g$ is a sequence of constant vectors, each equaling gravity; $a_e(n)$ is the object's acceleration measured in earth reference frame. The value $a_e(n)$ can be obtained by double differentiating the absolute position measurement. One way to do the differentiate calculation is by a filter:

$$a_e(n) = \frac{p_e(n) + 2p_e(n-1) + p_e(n-2)}{T_S^2}$$

where $p_e(n)$ is the absolute position sensor's output. When the absolute velocity measurement is available directly (e.g., some GPS sensor provides velocity measurement directly), $a_e(n)$ can be obtained by single-differentiating the velocity:

$$a_e(n) = \frac{v_e(n) - v_e(n-1)}{T_S}$$

In some embodiments, the combination filter F and the differentiation filter or filters can be combined, which may have the advantage of canceling some zeros/poles, thus simplifying the filter implementation.

Hence, the two vectors $A_n^c(n)$ and $A_e^c(n)$ are measuring the same physical vector in object's body frame and in earth frame, respectively.

Earth's gravitational field, mostly pointing downwards, varies slowly as a function of location. Detailed direction around where the object is can be obtained from previous measurements, for example, the WGS 84 Earth Gravitational Model, at http://earth-info.nga.mil/GandG/wgs84/gravitymod/.

One may use this detailed earth gravity field information while calculating the combined gravity $g_e^c$ in earth's reference frame.

Similar techniques can be used with other vector measuring techniques (e.g., using magnetometers). Magnetometers can be used to measure the magnetic field around the earth. We can construct a combined vector by filtering aligned magnetic field measurements in the object's body frame.

$$M_n^c = F(M_n^r)$$

The aligned signal can be calculated the same way as described for acceleration, but from magnetometer's measurements M(k).

$$M_n^c(k) = R_n^k M_n^r(k)$$

In the earth frame the combined vector can be constructed in the same way as described above for $g_c^1$:

$$M_e^c = F(M_e)$$

Where $M_e$ is a sequence of constant vectors, each equaling earth's magnetic field.

The circuit around the magnetometer might generate some local magnetic field which causes an error. When multiple aligned signals are combined, the effect of those local fields have a good chance to be canceled out and so the error can be reduced.

The filter used in combining the magnetometer's outputs can be different from the filter used to combine accelerometer outputs. However similar filter design techniques can be applied. The integration time, the cut-off frequency, and the DC gain, for example, can be designed using methods similar to the simulation/testing methods described above.

The earth's magnetic field mostly points north and varies slowly as a function of location. Detailed magnetic field direction around the region of the object's location can be obtained from previous measurements (e.g., International Geomagnetic Reference Field, at http://www.ngdc.noaa.gov/IAGA/vmod/igrf.html).

Vector measurements may come from other sensors too. For example, vector measurements may come from a star-tracking system where directions to stars are measured.

With more than two matching vector pairs—i.e., each vector pair containing a pair of vectors, one measured/constructed in the object's body frame and the other measured/constructed in earth frame—the object's orientation in all 3 degree of freedom can be obtained. For example, the matching pairs can be: 1. combined acceleration $A_n^c(n)$ in the body frame and in the earth's reference frame, $A_e^c(n)$; and 2. combined magnetic field $M_n^c(n)$ in the body frame and in the earth's reference frame, $M_e^c(k)$.

One way to do it is to:

1. normalize each vector to unit length (e.g., denoting the normalized vectors as $v_{n1}$ and $v_{n2}$ (the two vectors in the body frame) and $v_{e1}$ and $v_{e2}$ (the two vectors in earth frame));

2, in body frame, construct a unit vector $v'_{n2}$ that is orthogonal to $v_{n1}$ as a linear combination of $v_{n1}$ and $v_{n2}$, using the Gram-Schmidt Process:

$$v'_{n2} = \frac{v_{n2} - (v_{n2} \cdot v_{e1})v_{n1}}{|v_{n2} - (v_{n2} \cdot v_{e1})v_{n1}|}$$

3. construct a unit vector $v_{n3}$ by normalizing the cross product of $v_{n1}$ and $v_{n2}$:

$$v_{n3} = v_{n1} \times v'_{n2}$$

4. construct a rotation matrix from the three orthogonal unit vectors $v_{n1}$, $v'_{n2}$ and $v_{n3}$:

$$R^n = [v_{n1}, v'_{n2}, v_{n3}]$$

5. similar to steps 2, 3, and 4, construct rotation matrix $R^e$ from vector $v_{e1}$ and e in the earth frame; and 6. construct matrix $$R_n^e = R^n(R^e)^T$$

where matrix $R_n^e$ is the rotation matrix which maps a vector from the earth's frame to the body's frame and which represents the object's orientation.

Another way to find the object orientation from matching vector pairs is by solving Wahba's problem (see, http://en.wikipedia.org/wiki/Wahba's_problem), which is a well-studied problem. One solution to Wahba's problem can be found at the Journal of Astronautical Sciences Vol 38 No. 3 July-September 1988, pp 245-258, "Attitude Determination using vector observation and singular value decomposition" by F. Landis Markley.

One advantage of the method above is that it used a lesser number of computation steps. However, the general solution to Wahba's problem offers a more accurate result.

Note that, in one embodiment of the invention, only accelerometers and gyroscopes are used. They can be used to measure the downward direction for the object, which can be useful in some situations. For example, it can be used in a system where the object has to be kept level to the earth.

Similarly one can measure a north direction on the body from using magnetometers and gyroscopes.

In general, in some embodiments, vector measuring sensors (e.g., sensors like accelerometers and magnetometers) and gyroscopes can be used to combine the vectors measured by those sensors to estimate the object's one or more directions.

In some embodiments, the orientation of the object's body is used to merge an inertial position measurement (e.g., from accelerometers) in the body frame with an absolute position measurement of the target (e.g., from GPS sensors) in the earth frame. A more accurate position estimation—better than the absolute position measurement itself—can be obtained.

The acceleration measurement can be casted back to earth frame:

$$A_e(n) = (R_n^e)^T A(n)$$

$A_e(n)$ is also called rebased acceleration for notation purpose.

Then, it can be combined with an absolute position measurement, such as by GPS sensors. One way to combine them is to use a set of digital filters.

$$P_c = F_p(p_e) + F_a(A_e)$$

Where $F_p$ and $F_a$ are linear filters applied to a position measurement and a rebased acceleration respectively.

One way to design filters $F_p$ and $F_a$ is to use complementary filters. We can design a pair of filters $F_L$ and $F_H$ so that $$F_L + F_H = 1$$

In typical embodiments, $F_L$ is a low pass filter and $F_H$ is a high pass filter.

There are many ways to design complementary filters for example, we can design an analog high-pass filter with the transfer function:

$$f_H(s) = \frac{s^2}{\omega_0^2 + 2\eta\omega_0 s + s^2}$$

then $f_L(s) = 1 - f_H(s)$

Then, we can construct the transfer function for $F_a$ by multiplying a double-integrator to $f_H(s)$ $$f_a(s) = \frac{f_H(s)}{s^2} = \frac{1}{\omega_0^2 + 2\eta\omega_0 s + s^2}$$

Then, $F_a$ can be constructed by digitalizing the filter defined by $f_a(s)$. Filter $F_p$ can be constructed by digitalizing $f_L(s)$.

During the design process, $\omega_0$ is the cut-off frequency of the low-pass and high-pass filters. The cut-off frequency should be chosen such that $F_L$ filters out the high-frequency noise in the absolute position sensor measurements and $F_H$ filters out the low-frequency noise from the acceleration and the gyroscope measurements. $\eta$ is the quality factor of the complementary filters. Typically, we can choose $\eta$ to be about 0.5 to avoid frequency-domain overshoot.

As discussed above, the design of the complementary filters can be done by simulation and testing.

For detailed discussion about how to build complementary filters and how to efficiently calculate FIR filters can be found in Wensheng Hua's Ph.D. thesis at Stanford University, Electrical Engineering Dept. 2005, "LOW FREQUENCY VIBRATION ISOLATION AND ALIGNMENT SYSTEM FOR ADVANCED LIGO". One copy can be obtained at http://www.ligo.caltech.edu/~rana/docs/Theses/hua_thesis.pdf There are other ways to estimate the object's position and orientation.

In one embodiment of the invention, Kalman filtering is used to estimate the object's position an orientation. When the system is nonlinear, an Extended Kalman Filter can be used. Other linearization techniques can be used too. One way to build the Kalman filter is to use the combined vectors as virtual sensors's output. Then the Extended Kalman filter can be built as in common practice. The Kalman filter has a set of states including the object's position (denoted as p) and velocity (denoted as $\dot{p}$) in the earth reference frame, the object's orientation (denoted as q) and angular velocity (denoted as $\dot{q}$) measured in the earth's reference frame. The orientation can be implemented as a cosine matrix or as quaternions. Quaternions are preferred for the lesser computation requirements. In this context, p, $\dot{p}$, and $\dot{q}$ are 3 by 1 vectors. Denote the state of the Kalman filter as $$X = \begin{bmatrix} p \\ \dot{p} \\ q \\ \dot{q} \end{bmatrix},$$

for example, the model used can be defined by:

1) $\begin{bmatrix} p(n+1) \\ \dot{p}(n+1) \end{bmatrix} = \begin{bmatrix} 1 & T_S I \\ 0 & I \end{bmatrix} \begin{bmatrix} p(n) \\ \dot{p}(n) \end{bmatrix} + \begin{bmatrix} 0 \\ \omega_p(n) \end{bmatrix}$ where $\omega_p(n)$ denotes the amount of random walk per step that the object is assumed to take, adjusted to fit how much the object is supposed to move randomly;

$$q(n+1) = C(q(n), \dot{q}(n) T_S) \qquad 2)$$

where, function C denotes rotate quaternion q(n) by a rotation defined by $\dot{q}(n) T_S$; and $$\dot{q}(n+1) = \dot{q}(n) + \omega_q(n) \qquad 3)$$

where $\omega_q(n)$ denotes the amount of rotational random walk per step that the object is assumed to take, adjusted to fit how much the object is supposed to rotate randomly.

The observation functions are:

Accelerometers: $A(n)=R(q(n))(\dot{p}(n)-\dot{p}(n-1))+\omega_a(n)$ where $\omega_a(n)$ is the accelerometer noise. $R(q(n))$ is the rotation matrix defined by $q(n)$.

Gyroscope: $r(n)=R(q(n))(\dot{q}(n))+\omega_r(n)$ where $\omega_r(n)$ is the gyroscope noise.

GPS: $p_9(n)=p(n)+\omega_p(n)$ where $\omega_p(n)$ is the GPS noise.

Magnetometer: $M(n)=R(p(n))M_e+\omega_m(n)$ where $\omega_m(n)$ is the magnetometer noise and where $M_e$ is the earth magnetic field.

Combined Magnetometer: $M_n^c(n)=R(p(n))M_e^c+\omega_{mn}(n)$ where $\omega_{mn}(n)$ is the noise of the combined signal. The variance of $\omega_{mn}(n)$ might be hard to obtain directly, but can be estimated by simulation.

Combined Accelerometer: $A_n^c(n)=R(q(n))A_e^c(n)+\omega_{an}(n)$ where $\omega_{an}(n)$ is the noise of combined acceleration. The variance of where $\omega_{an}(n)$ might be hard to obtain directly, but can be estimated by simulation.

Note that using a magnetometer as part of the observation function is optional. A smaller Kalman filter can be built to estimate just a subset of the states. For example, one can build to estimate the orientation only without GPS a sensor: by not using the position and velocity as states, by not using the accelerometer measurement in the equations and using $g_n^c(n)$ in place of $A_n^c(n)$.

Details of Kalman filtering can be found, for example, at http://www.cs.unc.edu/~welch/kalman/.

Details of the Extended Kalman filter can be found at http://users.ices.utexas.edu/~terejanu/files/tutorialEKF.pdf Details of quaternions algebra is well studied. See, for example, http://www-users.cs.umn.edu/~trawny/Publications/Quaternions_Techreport.htm Another way of building a Kalman Filter is to use the combined vectors as state variables.

$$A_n^c(n+1) = \sum_{m=0}^{N_2} \frac{w(m)R(q(n))R(q(n-m))^2(\dot{q}(n-m)-\dot{q}(n-m-1))}{T_S} - \sum_{m=0}^{N_1} u(m)A_n^c(n-m)$$

Note here $R(q(n))R(q(n-m))^T$ is used to calculate $R_n^{n-m}$ and $$\frac{\dot{q}(n-m)-\dot{q}(n-m-1)}{T_S}$$

is used to calculate acceleration at time (n−m). This provides another way of constructing the combined vector.

Kalman filtering provides an efficient recursive way of estimating position and orientation. However, it is not the only way.

For example, the orientation information obtained by solving the Wahba's problem provides a good linearization point. The error contribution of all the noise and the error terms can be considered linear perturbation around the linearization points. Hence, one can use a maximum-likelihood method to find the global optimal estimation by solving linear equations.

I claim:

1. A method for measuring a position or an orientation of a moving object, comprising:
    mounting one or more sensors on the object, including an inertial orientation sensor and an absolute position or angle sensor, each sensor providing an output signal representative of a measurement taken by the sensor, wherein the output signal of the absolute position or angle sensor is provided aligned to a predetermined reference frame and wherein the output signal of the inertial orientation sensor is provided aligned to the object's body frame;
    combining the output signals of the sensors, including those of the inertial orientation sensor and the absolute position or angle sensor, over multiple time points to provide a system output signal representative of a vector related to one or more of velocity, position, and orientation of the object relative to the predetermined reference frame, wherein the filters combine the sensors' output signals at each time point in the object's body frame.

2. The method of claim 1, wherein the absolute position or angle sensor derives a vector in the predetermined reference frame, wherein the inertial orientation sensor derives a vector represented by its output signal in the body's frame, the method further comprises determining the object's orientation by combining the vector represented by the output signal in the body's frame with the vector in the predetermined reference frame.

3. The method of claim 2, wherein the vectors derived in the inertial orientation sensor and the absolute position or angle sensor each refer to a common physical vector.

4. The method of claim 3, wherein the vector derived in the absolute position or angle sensor is constructed by filters.

5. The method of claim 1, further comprising determining the object's orientation by comparing the vector derived from the output signal of the inertial orientation sensor with a derived gravity vector in the global reference frame.

6. The method of claim 5, wherein during the multiple points over which the output signals are combined, the object's velocity varies over a predetermined range.

7. The method of claim 1, further comprising providing a system output signal representative of changes in velocity of the object in the object's body frame.

8. The method of claim 7, further comprising using the changes in velocity to provide an estimate of the object's orientation.

9. The method of claim 5, wherein during the multiple points over which the output signals are combined, the object's position varies over a predetermined range.

10. The method of claim 9, further comprising providing a system output signal representative of changes in position of the object in the object's body frame.

11. The system as in claim 9, further comprising using changes in position to estimate the orientation of the object.

12. The method of claim 1, wherein the absolute position or angle sensor comprises a sensor which derives a position of the object in the predetermined reference frame, wherein at least one of the output signals of the sensors represents measurements of the position of the object in the object's body frame, and wherein one or more of the positions of the object measured in the object's body frame and one or more of the derived positions of the object in the predetermined reference frame are used to determine the object's orientation.

13. The method of claim 5, wherein comprising tracking and maintaining substantially equal changes of error in the derived gravity vector and changes of error in a sensed rotation.

14. The method of claim 5, wherein one or more of the output signals represent measurements of acceleration and wherein the filters maintain a ratio between a magnitude of the derived gravity vector and a magnitude of the measured acceleration a given time point to less than a predetermined value.

15. The method of claim 14, further comprising reducing the predetermined value over time.

16. The method of claim 1, further comprising providing filters having coefficients that are determined by simulation.

17. The method of claim 1, further comprising providing filters having coefficients that are determined empirically.

18. The method of claim 1, further comprising providing FIR filters.

19. The method of claim 18, wherein the filters have states that are updated between iterations.

20. The method of claim 18, wherein the filters minimize an error in the orientation of the object.

21. The method of claim 1, wherein the absolute position or angle sensor derives the Earth's magnetic vector in the predetermined reference frame, wherein at least one of the vectors represented by the output signals of the sensors is compared with the derived magnetic vector in the predetermined reference frame to determine the object's orientation.

22. The method of claim 1, further comprising first aligning the output signals of the sensors in the object's body frame at one of the multiple time points providing the system output signal.

23. The method of claim 1, wherein the sensors include at least one accelerometer.

24. The method of claim 1, wherein the inertial orientation sensor comprises one or more gyroscopes.

* * * * *